April 5, 1927.

R. CHILTON

TRANSMISSION

Filed June 29, 1926 3 Sheets-Sheet 1

1,623,306

INVENTOR
ROLAND CHILTON
BY
ATTORNEY

INVENTOR
ROLAND CHILTON
BY
ATTORNEY

Patented Apr. 5, 1927.

1,623,306

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

TRANSMISSION.

Application filed June 29, 1926. Serial No. 119,378.

This invention comprises a positive drive mechanism whereby a driven member may be smoothly accelerated from and driven by a rotating power means.

Objects of the invention are to provide a positive and shockless means for accelerating a driven means for continued rotation with a driving means and to avoid the loss of power characteristic of the use of slipping clutches for this purpose. Further objects are to provide a transmission mechanism which will automatically accelerate from zero to 1 to 1 ratio and then remain at the latter ratio indefinitely. Another object is to remove the limitation on the number of turns available from varying contour positive drive mechanism such as the chain and fusee movements of the prior art. These objects are obtained by disposing a driving spiral member or fusee co-axially with a driven drum and drivably connecting the two members by a chain passing over an idler member adapted for planetary rotation around and with the members when a 1 to 1 ratio is reached.

Figure 1:
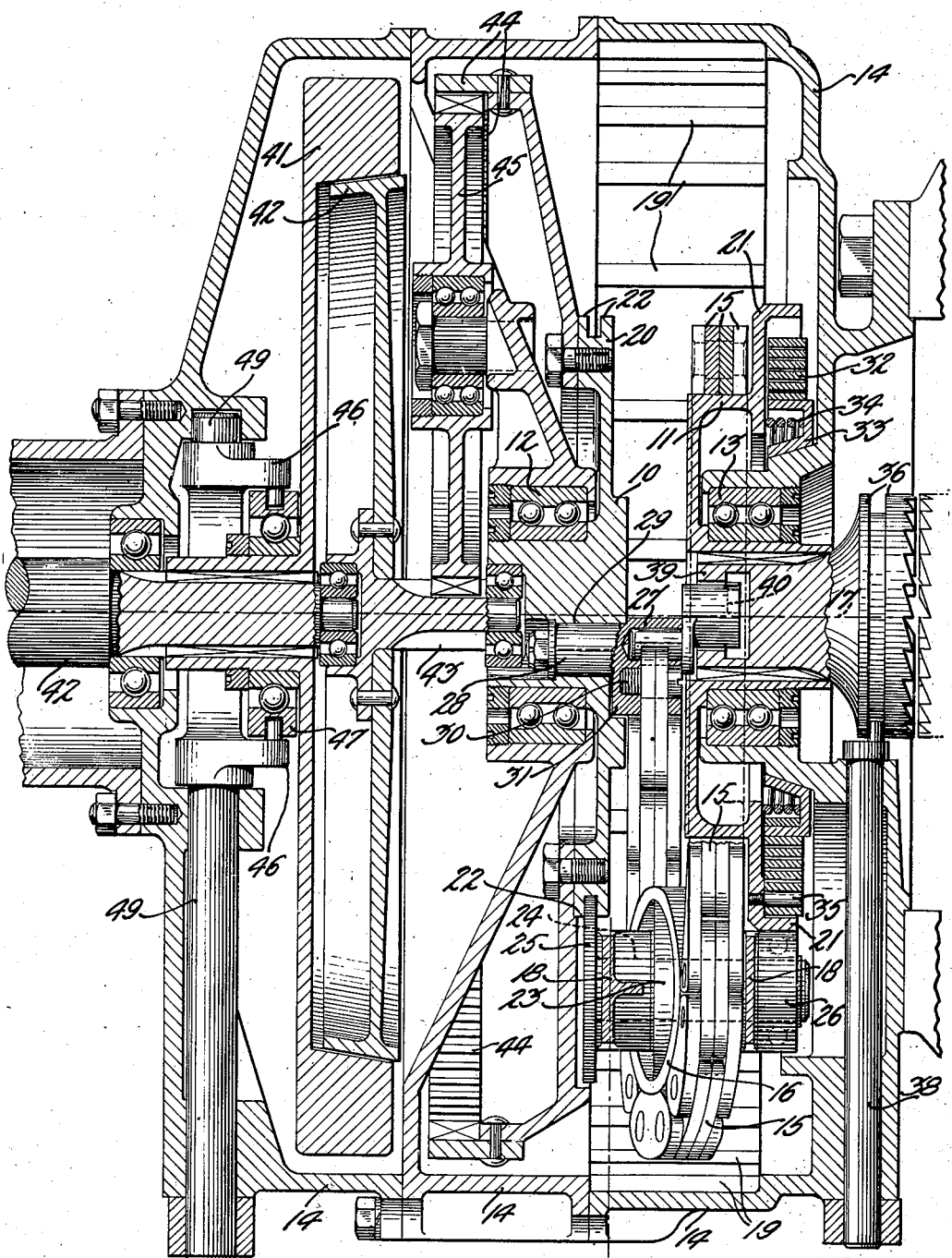
Figure 2:
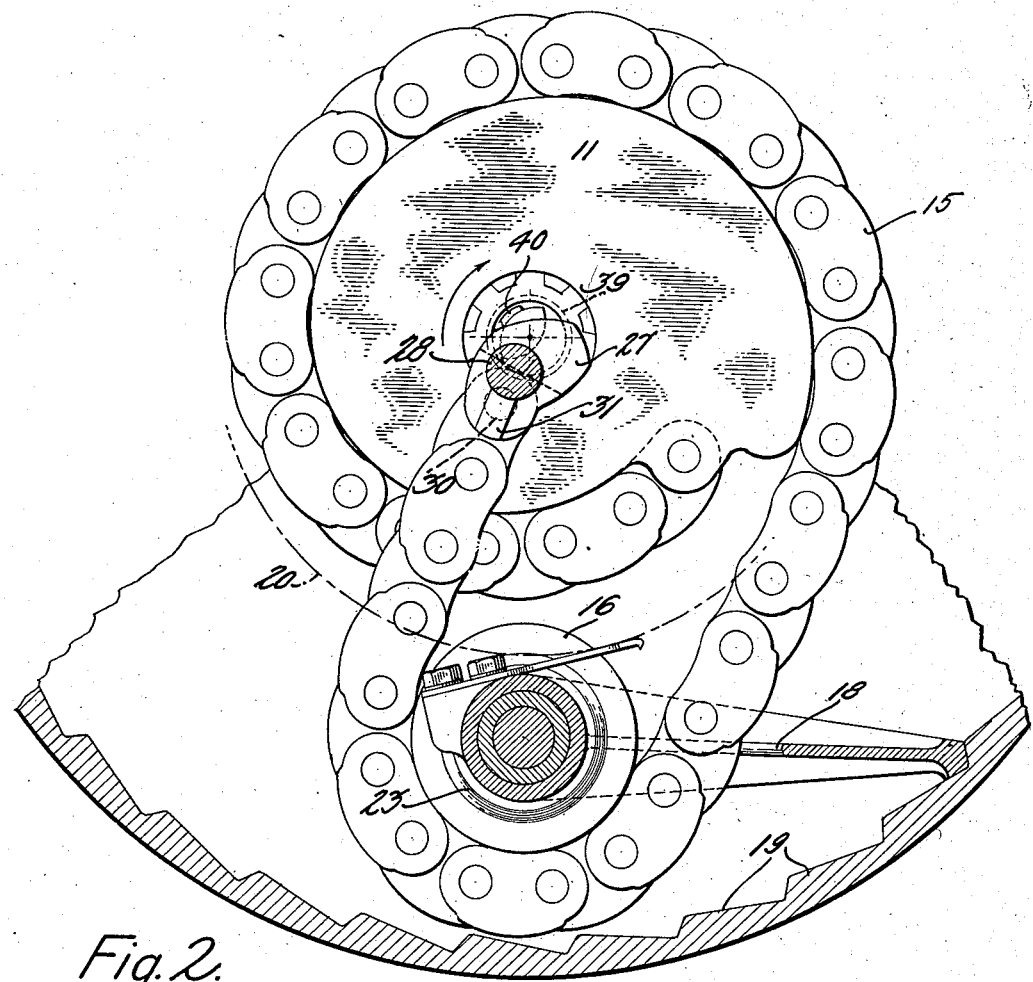
Figure 3:
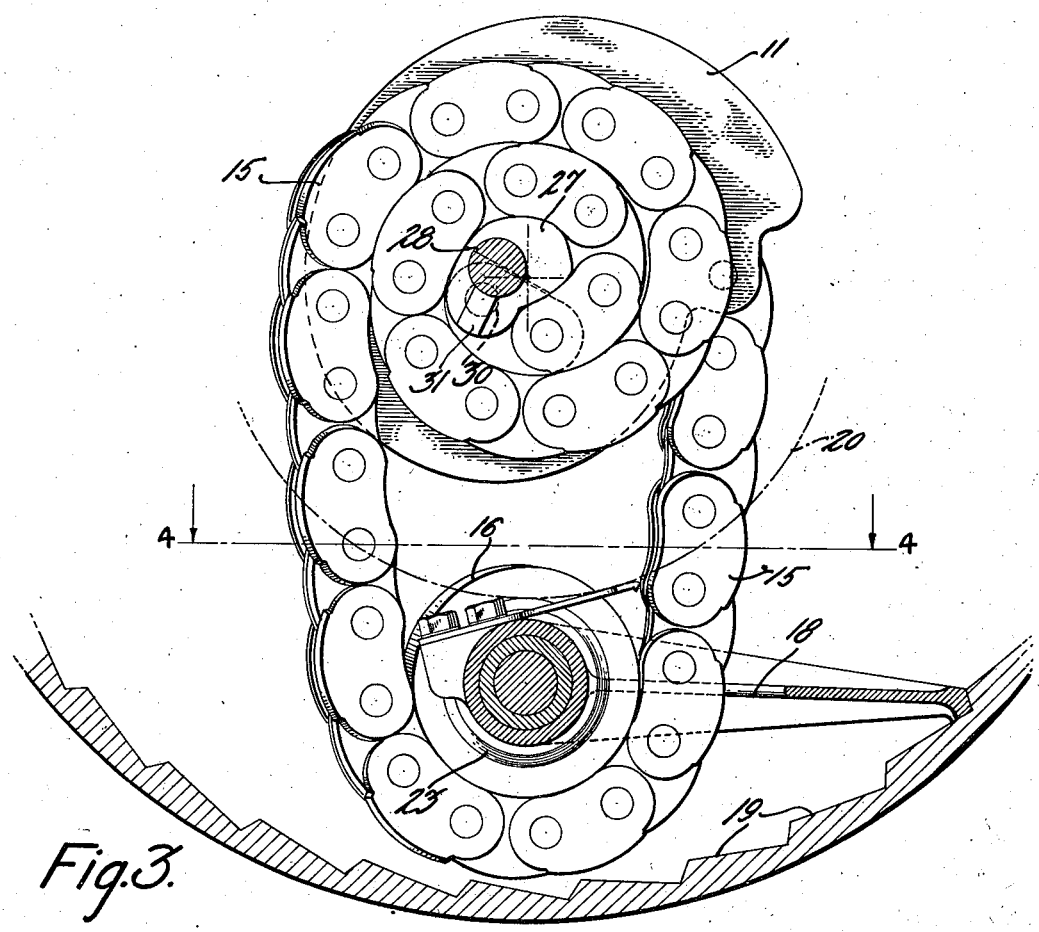

Flywheel type engine starters exemplify the objectives set forth and the embodiment of the present invention in such a mechanism is shown in the drawings in which Figure 1 is a vertical longitudinal section illustrating the present invention. Figure 2 is a transverse section taken on the line 2 of Fig. 1 looking in the direction indicated by the arrow. Figure 3 is a sectional view similar to Figure 2 showing the parts in a moved position.

Figure 4:
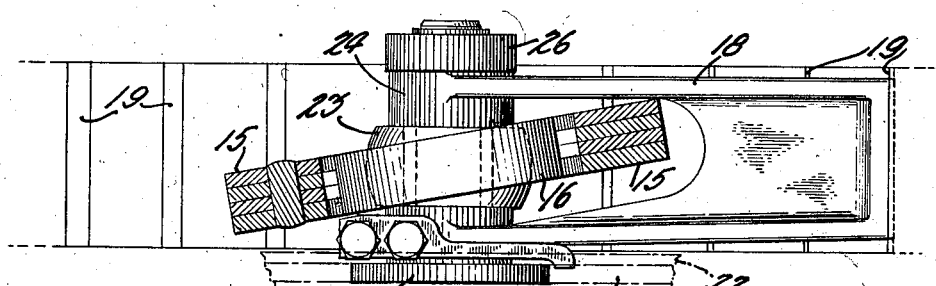

Figure 4 is a sectional view taken on the line 4—4 of Figure 3 as looking in the direction indicated by the arrows.

Referring particularly to Fig. 1, 10 designates the driving member or fusee and 11 the driven member respectively mounted on bearings 12, 13 in the housing 14. These members are drivably connected by a flexible tension member such as a chain 15 passing over an idler 16 supported for free forward planetary motion around the common axis 17 but restrained from backward rotation by the ratchet arm 18 (Figs. 3 & 4) engaged with teeth 19 in the housing. The preferred form of support for the idler comprises circular tracks 20, 21 formed on the periphery of the driving member 10 and the driven member 11, one track being provided with guide flanges 22. The idler 16 is mounted on a spherical hub 23 on the spindle 24, having a disc-shaped head 25 and an anti-friction bearing 26 respectively adapted to roll upon the tracks 20, 21.

One end of the chain 15 is anchored to the fusee or driving member 10 by an eccentric anchor member 27 while the other end of the chain is pinned to the driven member 11. The chain is arranged to wrap up on itself around the anchor member 27 and the links are profiled so that successive wraps of chain will fit the preceding ones over a spiral path adapted to give constant acceleration to the driven member.

Difficulties occur in conforming conventional chain of substantial pitch to the path of a spiral near the axis and the last link of the chain is accordingly pin jointed at 30 to the anchor member 27, having a cylindrical shank 28 engaged in a bearing 29 eccentrically bored in driving member 10. The anchor member is mounted for a limited amount of swing (approximately 90°) relative to the driving member at the end of which swing the key 31 abuts a suitable shoulder (not shown) in the driving member with which the anchor member subsequently rotates. The exterior of the anchor member is profiled for the wrapping of the first links of the chain thereon in spiral disposition.

A retraction spring 32 is frictionally anchored to the housing 14 by the cone member 33 and the spring 34 and is engaged at 35 with the driven member 11 to return the apparatus to the starting position.

As applied to an engine for starting, the engine engaging jaw 36 is splined to the driven member 11 and is controlled for axial movement by the shifting means 38. An annular shoulder 39 is formed within the shank of the jaw and a latch 40 eccentrically pivoted in the anchor member 27 engages the shoulder except when withdrawn by movement of the anchor member to the starting position shown in Fig. 2. It should be noted that this safety latch does not comprise a driving connection between the anchor member 27 and the driven jaw 36 but merely comprises a means for preventing meshing of the jaw except when this latch is swung away from the shoulder 39.

In the case of an inertia starter, a flywheel 41 may be slidably mounted on the shaft 42 of a power means such as an electric motor and co-operates with the clutch member 42 carrying the pinion 43 to drive the large annular gear 44 of the driving member 10 through the intermediate gears 45. The shaft 49 cooperates with the lever 46 and thrust bearing 47 to control the flywheel clutch and this shaft and the jaw shifting shaft 38 are preferably inter-connected for simultaneous operation.

Fig. 2 shows the chain in the initial position imposed by the spring 32 wherein the chain is fully wound upon the driven drum and unwrapped from the driving member from which it extends radially with the eccentric bearing of the anchor member and the pin connecting the chain to that member radially extended from the center of rotation. For the first quarter of a turn of the driving member, it will be seen that the action is that of a crank having a radius equal to the eccentricity of the anchor member bearing 29, and resulting in the well known harmonic acceleration of the crank and connecting rod movement from "dead center" position. Upon contact of the key 31 with the driving member, the anchor member 27 commences to rotate, the crank arm now being increased to the radius of the chain pin 30 in the anchor member about which pin the chain swings until the end link contacts with the profile of the anchor member about which wrapping proceeds, accompanied by the unwrapping of the chain from the driven member and resulting in the smooth acceleration thereof, until the position of Fig. 3 is reached.

Referring to Fig. 2 is will be seen that the pull in the parts of the chain on either side of the idler roller 16 must be equal and that the resulting reaction upon the idler roller 16 will bisect the angle between the chain sides, and accordingly imposes a backward planetary action on the idler which is resisted by the ratchet arm 18. When the radii at which the chain leaves the drive and driven members become equal, i. e., in the position of Fig. 3 the apparatus has reached the 1 to 1 ratio condition, i. e., the driven drum has been accelerated to unitary speed with the driving member and the chain sides having equal slope, the resultant force passes through the common axis 17 and there is no planetary tendency upon the idler. Should the apparatus however, tend to go beyond the 1 to 1 ratio of Fig. 3, the planetary tendency of the idler will be forward, in which direction it is free to rotate with the drive members and the drive at 1 to 1 ratio may be accordingly continued through an indefinite number of turns without movement between the driving parts.

In the foregoing description and the annexed claims, the flexible drive member has been described as a chain and it is to be understood that any known equivalent such as a flexible band or cable may be substituted without departing from the spirit of this invention.

Variations may be resorted to within the scope of the invention and portions of the improvements may be used without the others, whilst not departing from the spirit of the invention.

Having thus described my invention, I claim:—

1. A planetary drive comprising in combination, a driving member, a driven member, a tension member wrapped about both of said members, an idler for said tension member adapted for planetary motion about the axis of said driving and driven members, and means adapted to restrict the idler to one-way planetary motion.

2. In apparatus of the class described, the combination of a driving member, a driven member co-axial therewith, a drive member adapted to be spirally wrapped upon the driving member to accelerate the driven member therefrom, and a drive member idler supported for forward planetary motion about the driving and driven members.

3. In apparatus of the class described the combination of, a driving member, a drive chain connected to the driving member for uniform acceleration therefrom, a drum co-axial with the driving member and drivably engaged by said chain, and a chain engaging idler adapted for planetary motion around the common axis.

4. In apparatus of the class described, the combination of co-axial driving and driven members, an idler wheel adapted for forward planetary motion about said members and restrained against rearward motion, and a flexible tension member passed over the idler and drivably connecting the members.

5. In apparatus of the class described, the combination of co-axial driving and driven members, an idler wheel adapted for forward planetary motion and restrained against rearward motion, and a tension member passed over the idler and drivably connecting the members; said tension member adapted for wrapping about one of said members upon a spiral path.

6. In a mechanical movement having a fusee and a driven drum connected by a flexible tension member, an idler engaged by the tension member and adapted for forward planetary motion with the fusee and the driven drum.

7. The combination of a driving member, a drive chain having one end secured near the center of the driving member and adapted to be spirally wrapped thereon at a progressively increasing radius, a driven member co-axial with the driving member and drivably wrapped by the chain, and means to automatically permit of the unitary rotation of the elements set forth.

8. The combination of, a driving member, a tension drive member having one end secured near the center of the driving member and adapted to be spirally wrapped thereon at a progressively increasing radii, a driven member co-axial with the driving member and drivably wrapped by the tension drive member, and means to automatically permit of the unitary rotation of the elements set forth when the tension drive member engages the two members at an equal radii.

9. The combination of, a driving chain, a pair of co-axial drive members adapted to be drivably wrapped by the chain at varying radii, and planet means adapted for unitary rotation with the members when the radii become equal.

10. The combination of, a driving member, a chain driven by the member at increasing radii thereon, a co-axial member driven by the chain, and a chain idler adapted for planetary rotation with the drive members when the chain radius upon one has increased to equal the chain radius upon the other.

11. A fusee adapted for the smooth acceleration from rest of a drive chain, comprising in combination a rotary member having an eccentric bearing, an anchor member journalled for limited rotation in the bearing, and a chain anchor pin disposed in the anchor member eccentrically to said journal.

12. Means for the smooth acceleration from rest of a drive chain, comprising an anchor member having a chain anchoring pin and profiled for the wrapping of the chain upon a spiral path passing through said pin, a shank on said anchor member eccentric to said pin, and a rotary driving member having an eccentric bearing engaging said shank for limited rotation.

13. In a fusee mechanism, the combination of a drive chain, a cranked end-link for the chain having a shank, and a drive member having an eccentric bearing in which said shank is engaged; said cranked end-link having a head profiled to form a base for spiral wrapping of the chain.

14. In a fusee mechanism, the combination of a chain, co-axial driving and driven members wrapped by the chain, and a chain end member engaging the driving member and adapted to oscillate past the axis thereof.

15. In apparatus of the class described, the combination of a flexible tension member, an end link for the tension member comprising a shank, a profiled head about which the tension member may be spirally wrapped, an anchor means for the tension member eccentric to said shank, and a rotary drive member eccentrically journalling said shank for the oscillation of said head past the center of rotation.

16. A planetary chain drive, comprising in combination co-axial chain wrapped driving and driven members, and a chain idler adapted for forward planetary motion therearound and restrained from backward planetary motion.

17. A planetary chain drive, comprising a driving member co-acting with the chain for the wrapping thereof upon a spiral path based on the center of rotation, a concentric driven member wrapped by the chain, and a chain idler supported for planetary rotation when the chain wraps on the two members become of equal size.

18. In a planetary chain drive, the combination of a driving and a driven member, a chain driving connection therebetween, an idler for the chain, means for the planetary support of said idler comprising circular tracks on the driving and driven members, and a planet axle having roll means engaging said tracks.

19. A planetary chain drive, comprising driving and driven members having roll tracks, a chain idler adapted to move planetwise on said tracks and a chain drivably connecting the members and passing over the idler.

20. A chain drive comprising in combination, concentric chain wrapped driving and driven members, and an eccentrically disposed idler adapted to guide the chain from one member to the other and also adapted for unitary planetary rotation with the members and the chain.

21. The combination of, a pair of concentric drive members, a flexible tension member, and an idler adapted to guide the tension member for wrapping from one member to the other and also adapted for unitary rotation with the other members set forth.

22. The combination of, a pair of co-axial drive members, an idler mounted for planetary movement, a flexible member drivably wrappable about said members and looped therebetween over said idler, and means for preventing backward planetary motion of the idler.

23. In apparatus of the class described, the combination of a drive flexible tension member having an end link, a driving member, an anchor member, a pin joint between the anchor member and the end link, and an anchor member journal offset from said pin and eccentrically carried for limited rotation in driving member; the whole adapted for an initial disposition with the tension member; the pin and the journal in radial extension from the axis of the driving member and for a final disposition in spiral conformation thereabout.

Signed at Keyport, in the county of Monmouth, and State of New Jersey, this 26th day of June, A. D. 1926.

ROLAND CHILTON.